Patented Nov. 1, 1938

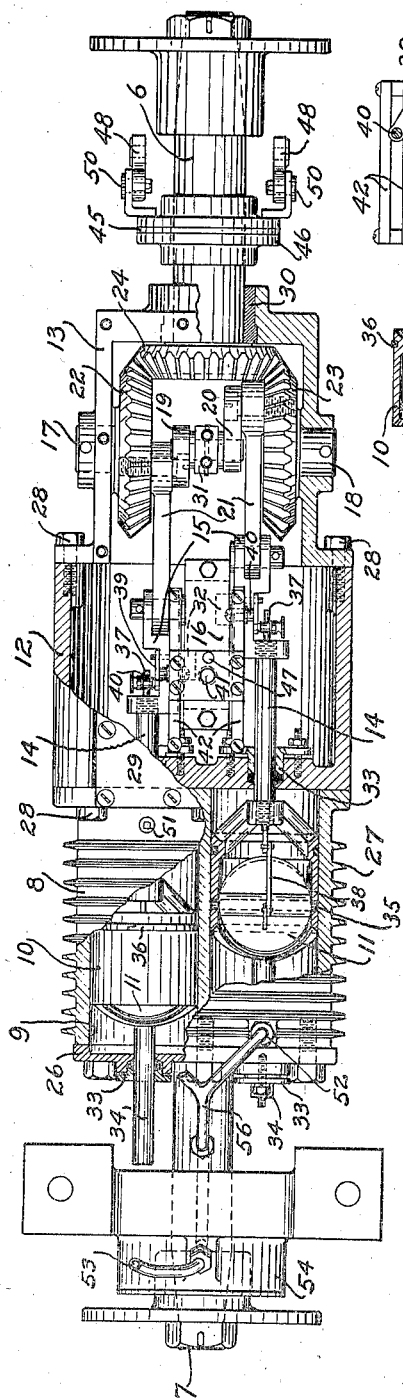

2,134,776

UNITED STATES PATENT OFFICE 2,134,776

HYDRAULIC TRANSMISSION

Baldwin Burhop, Milwaukee, Wis.

Application March 30, 1938, Serial No. 198,875

10 Claims. (Cl. 74—294)

My present invention relates to improvements in the art of transferring power from one member to another, and relates more specifically to improvements in the construction and operation of mechanism for transmitting motion from a driving element to a driven element at any desired speed.

Generally defined, an object of my invention is to provide an improved hydraulic transmission mechanism which is simple and compact in construction, and which is moreover highly efficient in operation.

It has heretofore been proposed to provide a hydraulic transmission consisting of two or more reciprocating pump units interposed between rotary alined driving and driven shafts, for the purpose of transferring motion at variable speed from one of the shafts to the other. In one of these prior transmission mechanisms which was especially contemplated for use in automobile propulsion, it was proposed to obtain the desired speed variation, by providing each pump unit with a pair of simultaneously reciprocable pistons having a body of oil or other liquid confined therebetween, and also having a stationary diaphragm with adjustable by-pass openings therein located between the alined and interconnected pistons and within the body of oil. By correspondingly varying the effective area of the by-pass openings of all of the diaphragms of the several pump units, it was contemplated to vary the speed of rotation of the driven shaft, the variation in velocity of flow of the liquid through the diaphragm openings being utilized to effect the speed changes. Other types of these hydraulic transmissions have also been proposed, and while the theory of operation is infallible, none of these prior mechanisms have proven commercially practicable for numerous reasons, such as undue complications in structure, inaccuracy in transmission due to inability to prevent excessive escape of actuating liquid and slippage thereof, excessive bulk of the assemblages and heating of the liquid, and extreme difficulty in operation.

The present invention therefore contemplates provision of an improved hydraulic variable speed transmission of the above mentioned general type, which is also especially adapted for vehicle propulsion or the like, and wherein the deficiencies of the prior devices are obviated.

In accordance with my present improvement, I provide two or more independent pump units each having a cylinder and a single piston provided with an improved balanced by-pass valve, all of the valves being accurately, conveniently and simultaneously controllable to secure any desired speed between zero and the speed of rotation of the driving member. The improved assemblage is relatively light and compact in order to eliminate undesirable flywheel effect, but is extremely durable and relatively simple and easy to construct and assemble. The various parts of my improved device are also easily accessible, and the actuating liquid cannot become excessively heated. I have also provided improved means for initially filling the pump chambers with liquid, and for subsequently compensating for possible loss of liquid due to leakage; and I have moreover provided a mechanism wherein undesirable slippage is eliminated and accurate transmission at any desired speed is made possible and practicable for various purposes.

A clear conception of an embodiment of my invention, and of the mode of constructing and of utilizing variable speed hydraulic transmissions built in accordance with the improvement, may be had by referring to the drawing accompanying and forming a part of this specification wherein like reference characters designate the same or similar parts in the various views.

Fig. 1 is a part sectional top view of my improved hydraulic transmission mechanism;

Fig. 2 is a part sectional side view of the assemblage, showing the by-pass valve wide open; and Fig. 3 is a fragmentary sectional side view of one of the pump pistons with the by-pass valve completely closed.

While I have shown only one form of the improved hydraulic transmission mechanism herein which is especially adapted for the propulsion of vehicles such as automobiles, it is not the intent to thereby unnecessarily restrict the scope or utility.

Referring to the drawing, the improved transmission assemblage shown therein comprises in general a driving member or shaft 6; a driven member or shaft 7 disposed in approximately axial alinement with the shaft 6; a pump casing 8 secured to and revolvable with the shaft 7 and having therein two parallel cylinder bores 9; a piston 10 reciprocable within each of the bores 9 and each having an adjustable butterfly by-pass valve 11 therein; a frame consisting of interconnected sections 12, 13 revolvable with and nected to the pump casing 8 and being journalled for relative rotation upon the driving shaft 6; piston rods 14 slidable within the frame section 12 and having cross-heads 15 coacting with parallel guides 16 confined within this section 12;

crank shafts 17, 18 rotatably journalled in the frame section 13 and having staggered cranks 19, 20 connected to the respective cross-heads 15 by means of connecting rods 21; bevel pinions 22, 23 secured respectively to the crank shafts 17, 18; a bevel gear 24 secured to the end of the shaft 6 within the frame section 13 and meshing with the pinions 22, 23 so as to cause the latter to revolve in opposite directions; and mechanism for effecting adjustment of the valves 11 during rotation of the assemblage and from a remote point or station.

The power or driving shaft 6 may be coupled to the engine of an automobile or the like, in any suitable manner, and the driven shaft 7 is rotatably supported in an antifriction bearing 25, which is preferably a ball bearing of the sealed type as shown in Fig. 2. The pump casing 8 is rigidly attached to the driven shaft 7 by means of a head flange 26, and the bored portion of the casing 8 is preferably provided with a series of external cooling fins 27 as clearly shown in Figs. 1 and 2. The intermediate frame section 12 is rigidly attached to the pump casing 8 by means of bolts 28, and the other frame section 13 is rigidly attached to the section 12 by means of similar bolts 28. The same sides of the frame sections 12, 13 have a continuous opening therein which is normally closed by a removable closure cover 29, removal of which effects unobstructed access to the interior of the frame. The end of the frame section 13 remote from the pump casing 8, is provided with a bearing 30 within which the driving shaft 6 is rotatable, and the entire pump casing and frame assembly is preferably formed of relatively small diameter sufficient only to permit housing of the movable elements therein. The weight of the parts is also preferably reduced to a minimum, consistent with requisite strength, and the driven shaft 7 may be connected to any device or apparatus which is to be propelled.

The bevel pinions 22, 23 which are secured to the crank shafts 17, 18 respectively, and which are adapted to be simultaneously rotated in opposite directions by the main driving gear 24, are preferably of like and interchangeable construction, and the crank shafts 17, 18 have their inner ends independently journalled in a central bearing block 31 secured to the casing section 13. The cross-heads 15 have lateral guiding projections 32 which coact with the common guides 16, and are simultaneously reciprocable along these guides but in opposite directions. The piston rods 14 which are firmly secured to the cross-heads 15, are hollow and enter the cylinders through stuffing boxes 33; and the ends of the pistons 10 remote from the rods 14 are provided with displacement rods 34 which slidably penetrate the head flange 26 through other stuffing-boxes 33. The valves 11 are preferably of the butterfly type, being swingably supported on pivot pins 35, and are adapted to control the effective areas of the by-pass openings formed directly within the corresponding pistons 10. When these valves 11 are set as indicated in Fig. 2, the displacement chambers within the bores 9 on opposite sides of the pistons 10 are in free and fully open communication with each other; and when the valves 11 are set as shown in Fig. 3, there is no communication whatever between the displacement chambers on the opposite sides of each piston 10. The pistons 10 are preferably provided with snap rings 36 coacting with the bores 9 in order to prevent leakage of liquid past the piston peripheries.

The by-pass valves 11 are preferably adjustable to vary the effective area of the by-pass openings in the pistons 10 from the exterior of the casing 8 and from a remote station, and the mechanism for simultaneously effecting similar adjustment of all of the valves 11 must be operable while the assemblage is revolving and without interfering with the gearing for reciprocating the pistons. This improved adjusting mechanism comprises an actuating rod 37 slidably penetrating each piston rod 14 and having its inner end operatively attached to an eccentric pin on the corresponding valve 11 by means of a connection 38; crank arms 39 swingably suspended from the cross-heads 15 and each having one arm pivotally and slidably associated with the outer end of the corresponding rod 37 and its other arm provided with a laterally projecting pin 40; a shifting bar 41 slidably mounted in the frame section 12 and cover 29 and having guides 42 rigidly attached thereto and coacting with the pins 40 so as to permit free reciprocation of the latter with the pistons 10; a bell crank 43 pivotally attached to the exterior of the frame section 12 and having one arm pivotally and slidably attached to an end of the shifting bar 41; a rod 44 slidably mounted upon the frame section 13 and having one end pivotally attached to the other arm of the bell crank 43, while its other end is adjustably attached to a yoke 45; and a shifting collar 46 slidably but non-rotatably supported by the driving shaft 6 and coacting with the yoke 45 so as to permit revolution of the latter with the frame section 13. The shifting bar 41 is prevented from rotating about its own axis by means of a guide pin 47, and the collar 46 is shiftable along the shaft 6 by means of levers 48 carried by an actuating shaft 49 and coacting with pins 50 on the collar. With this assemblage of elements, the shaft 49 may be angularly adjusted to swing the levers 48 and to shift the collar 46 at any time, and such shifting of the collar 46 will obviously be transmitted through the motion yoke 45, rod 44, bell-crank 43, bar 41 and guides 42 to the several arms 39, rods 37, connections 38 and valves 11 so as to simultaneously shift these valves and to retain them in shifted position.

The pump cylinders are normally completely filled with a liquid such as oil, and in order to permit such filling, I provide each bore 9 with a removable plug 51 for permitting escape of confined air, and a check valve 52 is also provided on each cylinder. The oil is admissible under pressure through a pipe 53 communicating with the interior of a fixed casing 54, and the oil chamber within this casing 54 communicates with the sealed bearing 25 and with a passage 55 formed in the driven shaft 7. The passage 55 communicates through a pipe 56 with the inlet valve 52, and after the pump chambers have been completely filled, the plugs 51 must be inserted. The oil under pressure thereafter supplied to the pipe 53 will flow through the passage 55 and pipe 56 past the check valve 52 into the piston displacement chambers, in case of leakage, and will always maintain these chambers completely filled with incompressible liquid. The interior of the frame sections 12, 13 are also preferably supplied with grease for lubricating the mechanism confined therein, and this grease and the oil within the pump structures insures ample lubrication of the entire assemblage at all times.

While the normal operation of my improved hydraulic transmission mechanism should be apparent from the foregoing detailed description of the construction thereof, I shall give a short resume of this operation. When the displacement chambers of the bores 9 have been properly initially supplied with oil or other suitable liquid, and the plugs 51 have been inserted, and the chamber within the frame sections 12, 13 has been supplied with grease and the closure cover 29 applied, the improved mechanism is in condition for normal operation. The driving shaft 6 may then be operated at any desired speed from any suitable source of power. The by-pass valves 11 may thereafter be adjusted to any desired position by merely manipulating the levers 48, and when a particular position of adjustment has been attained, the valves 11 will remain in adjusted position. If the valves 11 are set as shown in Fig. 2, and the driving shaft 6 is rotated, the rotation of this shaft will be imparted through the gear 24 to the pinions 22, 23 and from thence through the cranks 19, 20, connecting rods 21, cross-heads 15, and piston rods 14 to the pistons 10. Because the valves 11 are fully opened, the pistons 10 will merely reciprocate within their bores 9 and the oil from one side of the pistons will merely pass therethrough to the other side without imparting motion to the casing 8 or the driven shaft 7. If the valve adjusting mechanism is thereafter manipulated so as to partially close the valves 11, then the movement from one side of the pistons to the other will be retarded and this retardation of the oil flow will proportionately retard the movement of the pistons 10. This retardation of the pistons will impart revolving motion to the cylinder casing 8, in proportion to the degree of closing of the valves 11, and will cause the driven shaft 7 to revolve at a proportionately lower speed. If the valves 11 are subsequently adjusted to closed position as shown in Fig. 3, then the cylinder casing 8 will be revolved at the same speed as that of the driving shaft 6 and the driven shaft 7 will rotate at like speed. It will thus be noted that any desired speed from zero to the maximum speed to the driving shaft 6, may be imparted to the driven shaft 7, by merely adjusting the positions of the butterfly valves 11.

From the foregoing detailed description it will be apparent that my invention provides an extremely simple and compact hydraulic transmission which is readily adjustable to transfer motion from one shaft to another at any desired speed. The power may obviously be applied to either of the shafts 6, 7. The valves 11 are conveniently adjustable while the shafts 6, 7, casing 8 and frame sections 13, 14 are revolving, and without interfering with movement of the pistons 10 by gearing associated with the driving shaft 6. The fins 27 associated with the cylinder casing 8 will prevent excessive heating of the oil within the bores 9, and if the displacement chambers are constantly maintained filled with incompressible liquid, the transfer of motion will always be accurate and uniform for a definite setting of the valves 11. The entire assemblage has minimum diameter and weight, and therefore obviates undesirable flywheel effect, and all portions of the assemblage are conveniently accessible for inspection by merely removing the cover 29 and by disconnecting the casing and frame elements. I have found that an assemblage of this kind must be perfectly balanced in order to avoid undesirable vibration during rotation thereof, and in my structure I have not only dynamically balanced the revolving mechanical elements, but I have also eliminated unbalanced conditions in the liquid body. In the improved assemblage, the liquid bodies in the cylinder bores are maintained relatively fixed instead of being reciprocated, thus maintaining the desired balanced condition at all times, and avoiding vibration. My improved hydraulic transmission has proven highly satisfactory in actual use, especially in driving an automobile, and can obviously be manufactured and sold at relatively low cost as compared to the present automobile transmission systems.

It should be understood that it is not desired to limit this invention to the exact details of construction or to the precise mode of operation, herein shown and described, for various modifications within the scope of the claims may occur to persons skilled in the art.

I claim:—

1. A hydraulic transmission comprising, approximately alined driving and driven shafts, a casing secured to one of said shafts and having parallel cylinder bores extending toward the other shaft, a single piston reciprocable within each of said cylinder bores and having a by-pass valve directly therein, and gearing interposed between said pistons and said other shaft, said gearing being operable by said other shaft to reciprocate said pistons.

2. A hydraulic transmission comprising, approximately alined driving and driven shafts, a casing secured to one of said shafts and having parallel cylinder bores extending toward the other shaft, a single piston reciprocable within each of said cylinder bores and having a by-pass valve directly therein, gearing interposed between said pistons and said other shaft, said gearing being operable by said other shaft to reciprocate said pistons, and means operable from the exterior of said casing for changing the setting of all of said valves.

3. A hydraulic transmission comprising, driving and driven shafts having adjoining ends, a casing secured to the end of said driven shaft and having parallel cylinder bores extending toward said driving shaft end, a single piston reciprocable within each of said cylinder bores and having a by-pass opening therein, a butterfly valve carried by each of said pistons for controlling the effective area of the by-pass opening, gearing operable by said driving shaft to reciprocate said pistons and a frame connecting said casing and said driving shaft and being journalled on the latter.

4. A hydraulic transmission comprising, driving and driven shafts having adjoining ends, a casing secured to the end of said driven shaft and having parallel cylinder bores extending toward said driving shaft end, a single piston reciprocable within each of said cylinder bores and having a by-pass opening therein, a butterfly valve carried by each of said pistons for controlling the effective area of the by-pass opening, gearing operable by said driving shaft to reciprocate said pistons, and means operable from the exterior of said casing for simultaneously adjusting all of said valves.

5. A hydraulic transmission comprising, driving and driven shafts, a casing assemblage secured to one of said shafts and journalled on the other and having parallel cylinder bores therein, a single piston reciprocable within each of said bores, said pistons having by-pass openings therethrough, a valve carried by each of said pistons for controlling the by-pass opening thereof, hollow rods for reciprocating said pistons, gearing operable by the other of said shafts for moving said pistons and said rods, and mechanism extending through said rods for effecting adjustment of said valves.

6. A hydraulic transmission comprising, driving and driven shafts, a casing assemblage secured to one of said shafts and journalled on the other and having parallel cylinder bores therein, a single piston reciprocable within each of said bores, said pistons having by-pass openings therethrough, a valve carried by each of said pistons for controlling the by-pass opening thereof, hollow rods for reciprocating said pistons, gearing operable by the other of said shafts for moving said pistons and said rods, and mechanism extending through said rods for effecting adjustment of said valves, said adjusting mechanism being operable from a stationary station externally of said casing.

7. A hydraulic transmission comprising, driving and driven shafts, a casing assemblage secured to one of said shafts and having parallel cylinder bores therein, a plurality of radiating fins associated with said casing around said bores, a piston reciprocable within each of said bores and having a by-pass valve directly therein, and mechanism driven by the other of said shafts for reciprocating said pistons.

8. A hydraulic transmission comprising, driving and driven shafts, a casing assemblage secured to one of said shafts and having parallel cylinder bores therein, a plurality of radiating fins associated with said casing around said bores, a piston reciprocable within each of said bores and having a by-pass valve directly therein, mechanism driven by the other of said shafts for reciprocating said pistons, and means for simultaneously adjusting all of said valves from the exterior of said casing and through said piston actuating mechanism.

9. A hydraulic transmission comprising, driving and driven shafts, a casing assemblage rotatable with one of said shafts and having parallel cylinder bores therein, a piston reciprocable in each of said bores, a liquid by-pass valve carried directly by each of said pistons, means for admitting liquid under pressure to each of said bores to constantly fill the space around the piston therein, and means operable by the other of said shafts for reciprocating said pistons.

10. A hydraulic transmission comprising, driving and driven shafts, a casing assemblage rotatable with one of said shafts and having parallel cylinder bores therein, a piston reciprocable in each of said bores, a liquid by-pass valve carried directly by each of said pistons, means for admitting liquid under pressure to each of said bores to constantly fill the space around the piston therein, and means operable by the other of said shafts for reciprocating said pistons, and means for adjusting all of said valves from the exterior of said casing and while said shafts are rotating.

BALDWIN BURHOP.